(12) United States Patent
Echternacht

(10) Patent No.: US 6,241,447 B1
(45) Date of Patent: Jun. 5, 2001

(54) CARRIAGE FOR A CONSTRUCTION PANEL

(76) Inventor: James E. Echternacht, 1605 Garden St., S. Bar, CA (US) 93101

( * ) Notice: Subject to any disclaimer, the term of this patent is extended or adjusted under 35 U.S.C. 154(b) by 0 days.

(21) Appl. No.: 09/371,121

(22) Filed: Aug. 10, 1999

Related U.S. Application Data

(60) Provisional application No. 60/096,644, filed on Aug. 14, 1998.

(51) Int. Cl.[7] .................................................. E04G 21/14
(52) U.S. Cl. ............................ 414/11; 414/10; 414/491; 414/673; 280/79.7
(58) Field of Search ................................. 414/11, 10, 494, 414/491, 673, 743; 280/79.7, 79.3, 79.4

(56) References Cited

U.S. PATENT DOCUMENTS

| | | | |
|---|---|---|---|
| 1,663,571 | 3/1928 | Shedd . | |
| 2,503,388 | * 4/1950 | Hedlund ................................. | 414/11 |
| 2,798,232 | 7/1957 | Ericsson .................................. | 5/328 |
| 3,138,265 | 6/1964 | Hansen ...................................... | 214/1 |
| 3,643,935 | 2/1972 | Bell .......................................... | 269/16 |
| 3,696,560 | 10/1972 | Hallin ...................................... | 49/425 |
| 3,923,167 | * 12/1975 | Blankenbeckler ................... | 214/1 D |
| 3,977,534 | * 8/1976 | Blake ..................................... | 52/749 |
| 4,241,930 | * 12/1980 | Bell et al. .......................... | 280/47.29 |
| 4,647,056 | * 3/1987 | Baker ..................................... | 280/37 |
| 4,752,173 | * 6/1988 | Fleming ................................. | 414/10 |
| 4,810,151 | * 3/1989 | Shern ..................................... | 414/11 |
| 5,441,379 | * 8/1995 | Gilbert, Jr. ........................... | 414/494 |
| 5,460,469 | * 10/1995 | Young .................................... | 414/11 |
| 5,584,635 | 12/1996 | Stapelmann ........................... | 414/11 |
| 5,984,605 | * 11/1999 | Young .................................... | 414/11 |
| 6,032,966 | * 3/2000 | Young .................................. | 280/79.7 |

* cited by examiner

*Primary Examiner*—Joseph A. Fischetti
(74) *Attorney, Agent, or Firm*—Roland H. Shubert

(57) ABSTRACT

A carriage for the transport and installation of heavy doors and other construction panels includes a door-holding frame that is pivotally attached to a wheeled chassis. Independent drive mechanisms provide accurate control over the elevation, tilt, and roll of a door panel held by the frame, and effect a precisely controlled, lateral movement of the panel relative to the frame.

13 Claims, 8 Drawing Sheets

CARRIAGE FOR A CONSTRUCTION PANEL

This application claim benefit to Provisional Application Ser. No. 60/096,644 filed Aug. 14, 1998.

BACKGROUND OF THE INVENTION

1. Technical Field

This invention relates to a wheeled carriage that is arranged to transport a door or other construction panel, and to precisely position the construction panel for installation.

2. Background Art

Small hollow core doors, such as the kind commonly found in residences, can be hung by one man without particular difficulty. However, commercial doors of the kind typically found in hotels, hospitals and office buildings often weigh two hundred pounds and more. Fitting such a heavy door to its frame is a more difficult task. It ordinarily requires two men working with shims, wedges and bars to maneuver a heavy door into proper position for hanging. Workmen hanging heavy doors in that fashion are also prone to injury, particularly pinched and crushed fingers, and back strains.

The difficulties experienced in the fitting, renovation, and replacement of heavy doors and other construction panels has long been recognized and a number of dollys and trucks have been developed over the years to aid workmen in this endeavor. Examples of door handling dollys include U.S. Pat. No. 3,138,265 to Hansen; U.S. Pat. No. 3,643,935 to Bell; and U.S. Pat. No. 4,978,132 to Wilson et al. Those prior art dollys have in common a wheeled base and a frame to which a door may be secured during transport and while positioning the door to fit within an opening. The dolly that is described in the Hansen patent is arranged so that the frame holding a door panel tilts between a reclining travel position and a vertical installation position. When a door transported on the Hansen dolly is in an upright installation position, its center of mass is forward of the dolly base. In that position the dolly and door are unstable and have a tendency to tilt forward as the weight of the door and the frame is cantilevered ahead of the wheels of the base. Further, Hansen's door holding frame cannot be elevated or turned relative to the dolly base when the frame is upright; both functions being important when attempting to align a door with a mounting location.

A dolly and workbench combination is disclosed by Bell in his U.S. Pat. No. 3,643,935. The dolly includes a chassis mounted upon caster wheels, the chassis having a pair of uprights mounted thereupon. Each upright supports a tiltable beam that is arranged to support and to secure a door or other similar panel. The dolly can be used to transport a door from one place to another, and to position it for convenient mounting of hardware and hinges. Another wheeled hand truck is disclosed in the Wilson et al patent, U.S. Pat. No. 4,978,132. The truck itself is of L-shape and is arranged to securely hold a door or other panel member for transport. The truck frame can be tilted about a pair of wheels mounted to the frame adjacent the frame apex so that a door can be positioned either vertically or on its side.

The inventor's previous patent, U.S. Pat. No. 5,762,348, provided a carriage device that obviated many of the problems inherent in prior designs. That carriage provided a wheeled base to which was attached a moveable frame that was arranged to securely support a door. The frame was provided with orientation means that allowed the frame to position the door between an upright installation position and a reclined transport position. Bearing means were provided below the frame so that at least part of the weight of the door was transferred to those bearing means when the door was in its upright position, thereby avoiding the instability that was inherent in prior designs. The present invention is an improvement of the inventor's previous carriage, providing enhanced adjustability and stability when aligning a door with its mounting position.

SUMMARY OF THE INVENTION

The panel handling carriage of this invention includes a chassis or base having wheels that provide a multi-point planar support for the chassis, and a panel-holding, planar frame that is pivoted to the chassis adjacent the front thereof. The frame includes a pair of upwardly extending side members joined by cross members that hold the two side members rigidly spaced apart. A roller or other wheel means is attached to the lower end of each side member, and the position of each roller is adjustable so as to effectively lengthen or shorten each side member. A panel-supporting sill member is disposed across the lower frame end, and is arranged to hold a panel adjacent to and parallel with the plane of the frame. The sill member and its supported panel are horizontally movable a short distance back and forth relative to the frame and base, parallel to the plane of the frame.

It is therefore an object of this invention to enhance the stability and positional control of a panel-handling carriage when positioning a panel within its mounting location.

Another object of this invention is to provide adjustment means for a carriage frame to thereby allow movement of a panel relative to the carriage frame.

Other objects of the invention will become apparent from the following detailed description of the invention.

DETAILED DESCRIPTION OF THE INVENTION

Figure 1:
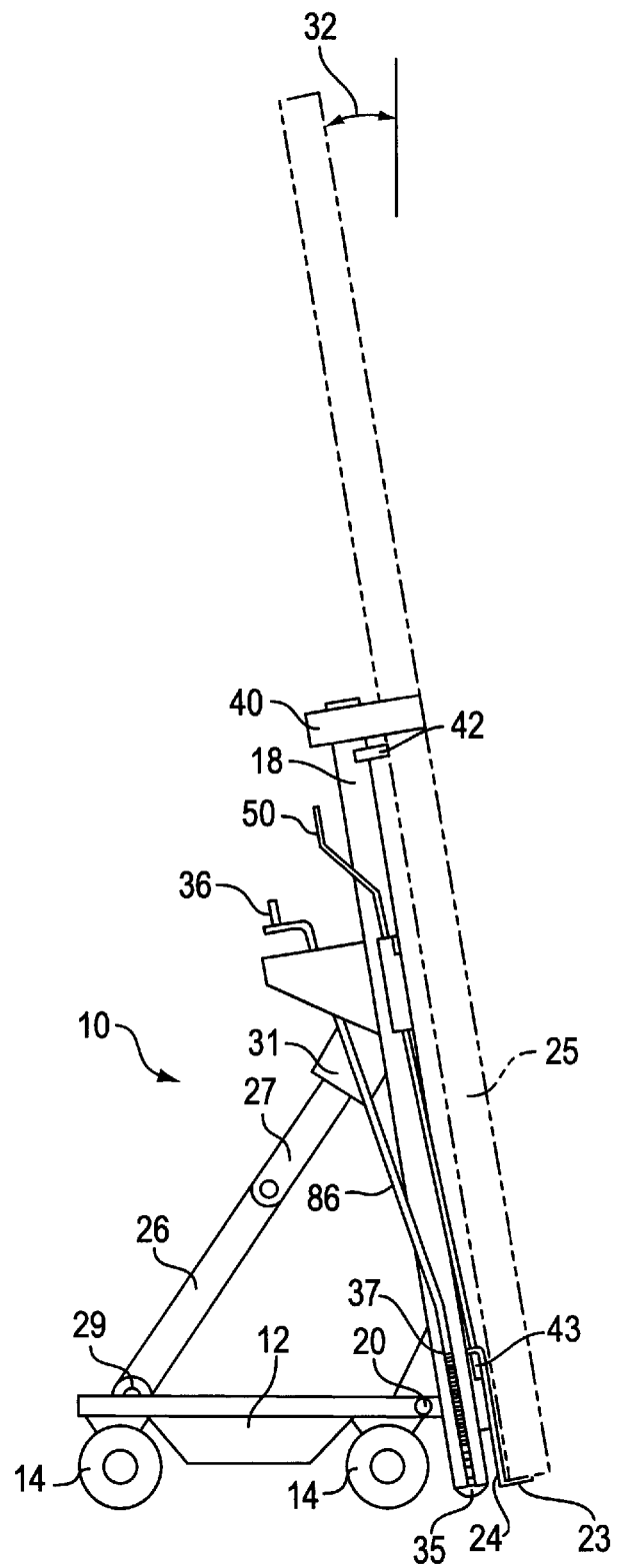
FIG. 1 is a generally schematic side view of the improved carriage of this invention holding a door panel in a door transport position.
Figure 2:
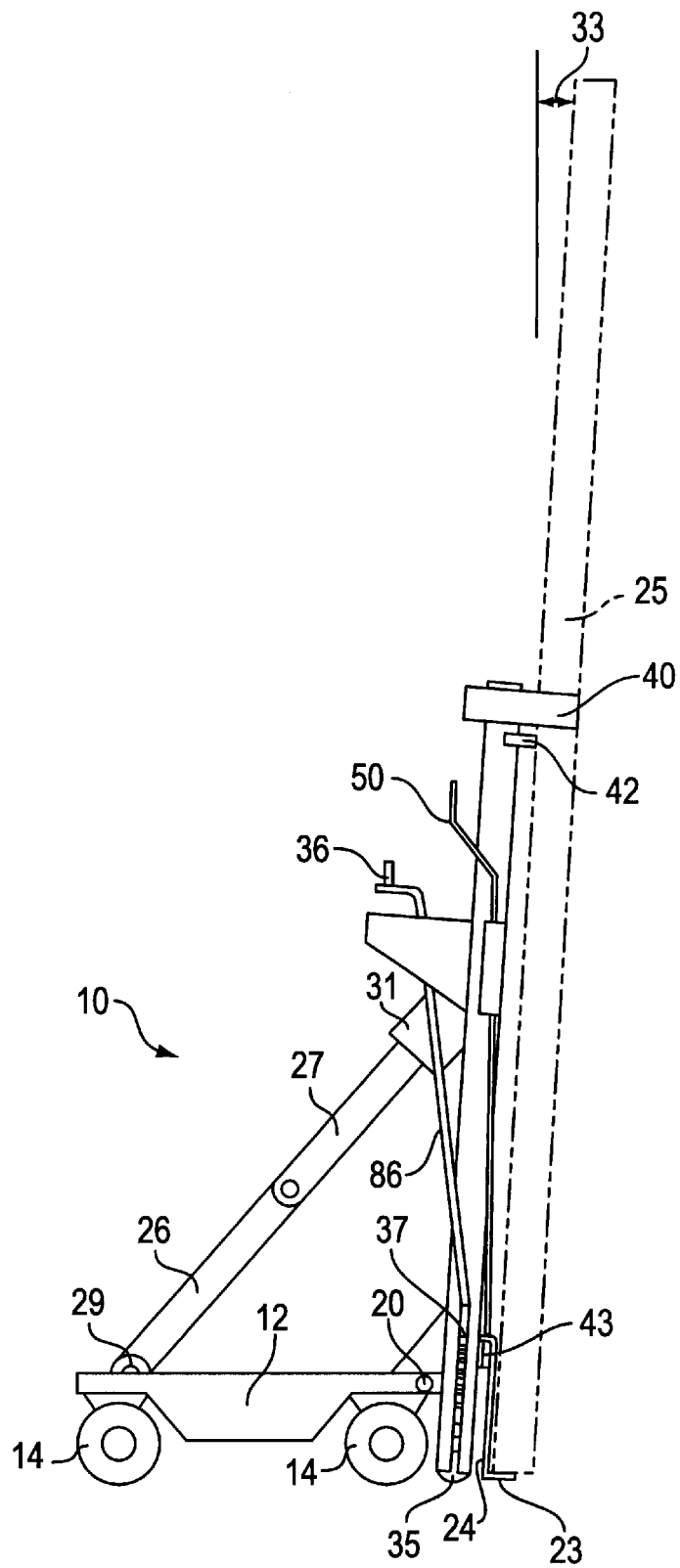
FIG. 2 is a view of the carriage of FIG. 1 holding a door panel in an extreme, installation position.

Referring first to FIGS. 1 and 2, the carriage of this invention is generally designated with numeral 10. Carriage 10 includes a chassis or base 12 that is supported by a plurality, suitably four, caster wheels 14 to thereby provide a multi-point rolling support for the carriage base. It is preferred that at least one of the casters be equipped with brake means which can be set to keep the wheel from rotating about its axis. Frame means which include frame side members 18 are pivotally mounted to base 12 at pivot points 20 that are located on either side and adjacent the front end of base 12. An L-shaped bottom sill member having a generally horizontal shelf portion 23 and a generally vertical back 24 is movably connected to the frame and is arranged to support the lower edge of a door or other planar construction panel 25 which is shown in dashed outline. An articulated, diagonal member comprising lower segment 26 and upper segment 27 extends from a location 29 adjacent the back of base 12 to a mid-point of the frame to thereby hold the frame in a desired attitude.

FIG. 1 shows the carriage 10 in a transport position in which a door panel is held in a backward tilted attitude over the carriage body. Tilting the door at such an attitude allows the carriage and door to pass unimpeded through any frame opening into which the door fits. The angle of backward tilt 32, relative to vertical, is controlled by varying the length of the diagonal member, and preferably by adjusting the length of upper segment 27 through door tilt mechanism 31 which is illustrated in more detail in FIGS. 5 and 6. Tilt mechanism 31 includes a secondary, or fine, tilt adjustment that is used for the accurate positioning of a door or other panel at an installation location. Angle 32 is preferably fixed at about 15° by a stop that is incorporated into segment 27 and the length adjustment mechanism 31 so that a door 25 in the transport position makes about a 75° angle with the floor or other surface. Tilting the door at that angle increases the stability of the door during transport as well as allowing it to be transported sideways through any framed door opening into which the door fits. The secondary length adjustment feature of mechanism 31 is also arranged to allow a slight forward tilt relative to the vertical, shown as angle 33 of FIG. 2, so as to allow total flexibility in installing a door within its frame. Tilt mechanism 31 is arranged to limit angle 33 to no more than about 10°, and preferably to no more than 3° to 5°, so that the door does not overbalance carriage 10 and cause it to tip forward.

A vertical adjustment mechanism is incorporated into each of frame side members 18. That vertical adjustment mechanism includes a wheel or roller 35 at the bottom of each side member 18 that is raised or lowered relative to each side member 18 by means of a hand crank 36 which actuates threaded drive mechanism 37. Drive mechanism 37 is shown in more detail in FIG. 8. Lowering rollers 35 to contact the floor or other work surface transfers a portion of the panel weight to those rollers to thereby increase the stability of the entire unit during the installation procedure. Because the drive mechanism 37 of one side member 18 may be actuated independently of the drive mechanism in the other side member, a roll displacement of the door panel and the frame is achieved relative to the floor or other operating surface. Thus, the door panel is rolled, or inclined laterally in the plane of the carriage frame so as to easily fit the panel into an frame or opening that is not plumb.

Figure 3:
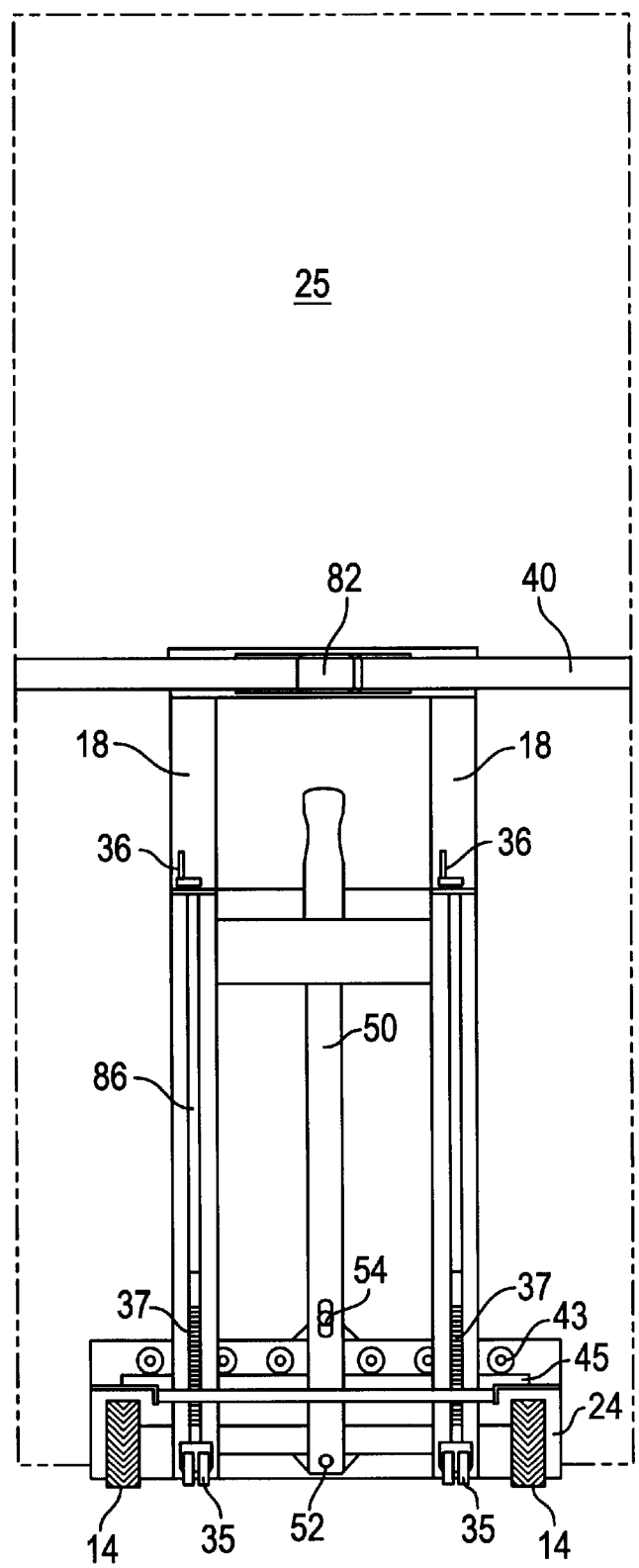
FIG. 3 is a view from the operator's side of the carriage frame illustrating the mechanism for laterally adjusting the position of a door panel, while securing the panel to the frame.
Figure 4:
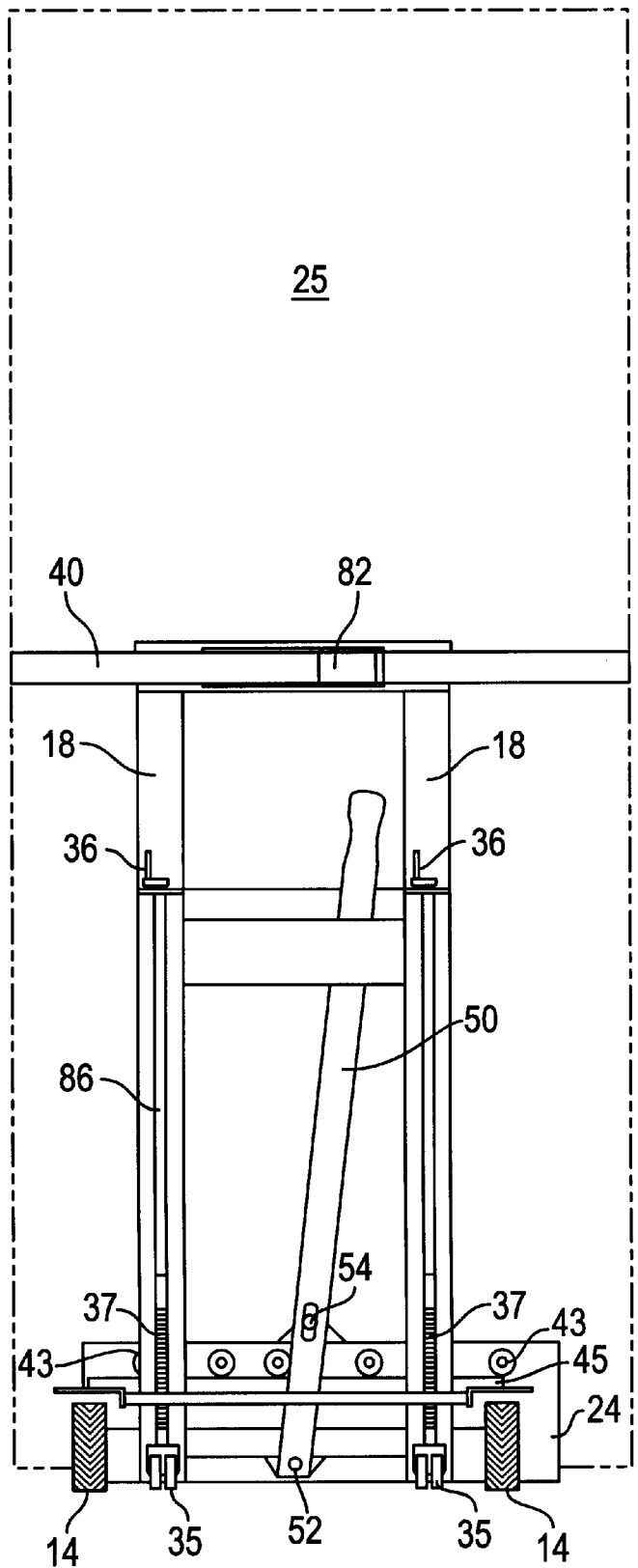
FIG. 4 depicts the mechanism of FIG. 3 in a different position.

Reference is made now to FIGS. 3 and 4 as well as FIGS. 1 and 2. FIGS. 3 and 4 show the carriage of FIGS. 1 and 2 from the operator's position, back of and perpendicular to the plane of door panel 25. As is shown in the various Figures, an edge of a door or other construction panel 25 rests upon sill shelf member 23 and is secured to the frame of carriage 10 by strapping means 40. A pair of door support rollers 42 are mounted, one on either side of the frame, adjacent strapping means 40. Those rollers, in cooperation with a lower set of sill support rollers 43 that are mounted on the operator side of door sill back portion 24 adjacent the top thereof, allow free lateral movement of the door panel relative to the carriage frame. Sill support rollers 43 ride along the top of lower frame cross member 45. Lateral positioning of door panel 25 relative to the frame arms 18 is controlled by lever means 50. Lever 50 is pivotally fixed at its lower end to frame cross member 45 to thereby provide a fulcrum 52 for the lever. As is best illustrated in FIG. 4, lateral movement of lever 50 acts upon sill shelf member 23 through connection 54 to shift the position of the sill and its supported panel 25 back and forth relative to the carriage frame, and parallel to the plane of that frame.

Figure 5:
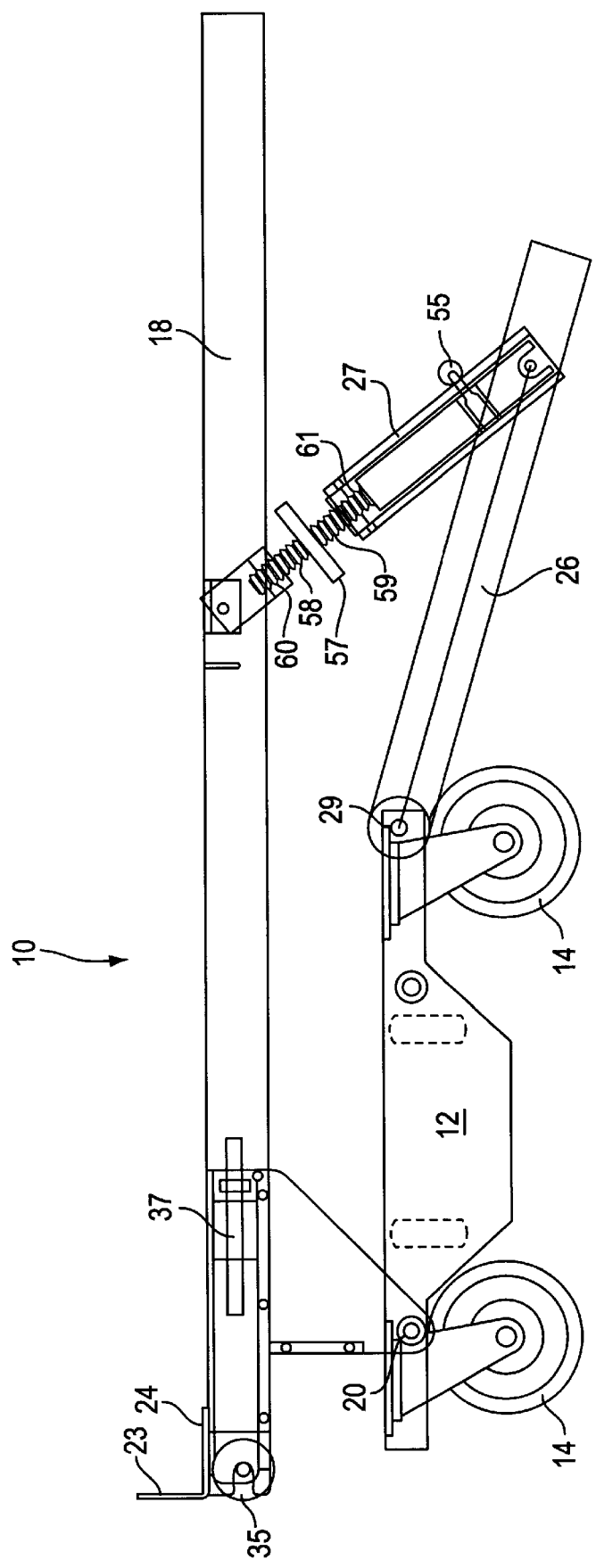
FIG. 5 is a side view of the carriage of FIG. 1 in a folded, or storage, position.

FIG. 5 is a side view of carriage 10 in a folded, or storage, position with frame arms 18 positioned essentially parallel to the top of carriage base 12, and parallel as well to the floor or other working surface. Frame arms 18 are moved to that position by releasing a pin stop 55 that holds the lower segment 26 and the upper segment 27 of the diagonal member in an aligned, end to end relationship. The upper and lower segments can then fold in upon themselves in the manner illustrated. Also shown are details of the tilt adjustment mechanism 31. Mechanism 31 may comprise a hand wheel 57 mounted centrally along a shaft having oppositely threaded portions, 58 and 59 on either side of the hand wheel. The threaded shaft ends, 58 and 59, engage complementary nut blocks 60 and 61, so that rotation of the hand wheel 57 lengthens or shortens upper segment 27. In turn, the lengthening or shortening of segment 27 cause the frame and its attached panel to tilt forward or backward.

Figure 6:
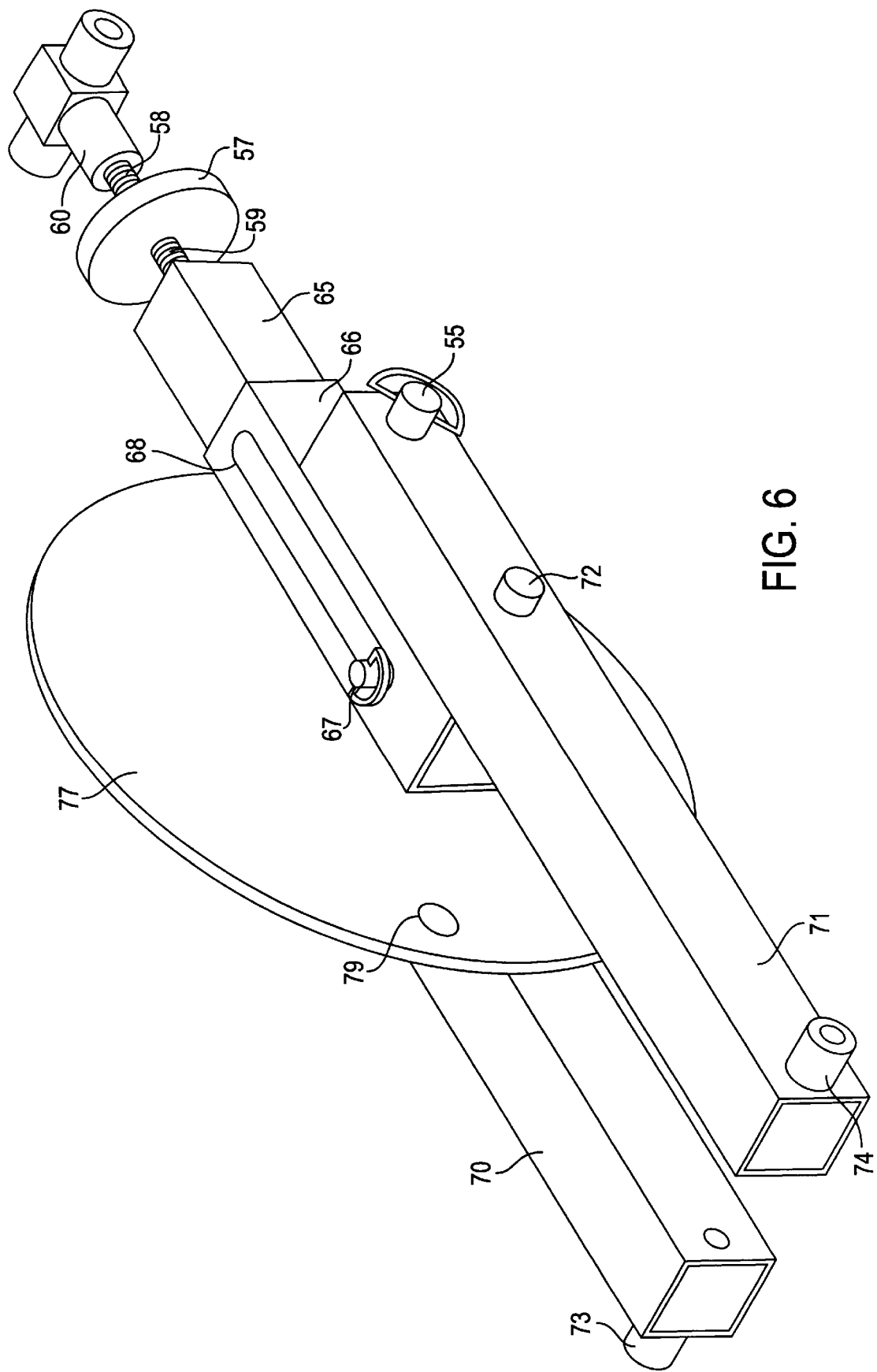
FIG. 6 is a detail view of a mechanism for fixedly holding the carriage frame in a transport, an installation, or a storage position.

Another embodiment of the diagonal member that is defined in FIGS. 1 and 2 by segments 26 and 27 and tilt adjustment mechanism 31 is shown in FIG. 6. In this embodiment, upper segment 27 comprises a bar member 65 that telescopically fits within box member 66. The extent of travel of bar 65 within box 66 is limited by a slot 68 formed in the top of box member 66 in cooperation with pin stop 67 which slidingly fits within slot 68 and is fixed to bar 65. The combined length of bar 65 and box 66 is shortest when the two elements are in the position shown, with stop 67 locked at one extreme end of slot 68. That position causes the frame and a door panel carried by the frame to tilt backward over the base 12 of carriage 10 in the transport position shown in FIG. 1. Bar 65 and box 66 are locked in the shortened, or transport, position by means of pin stop 67. The frame and its attached panel are moved to an essentially vertical, or installation, position when bar 65 is extended so that stop 67 is locked at the other end of slot 68.

Lower segment 26 of FIGS. 1 and 2 comprises in this embodiment a pair of arm members, 70 and 71, which bracket box member 66 and are free to rotate relative to member 66 about axle 72. The ends of arm members 70 and 71 that are opposite pin stop 55 pivotally connect to frame 12 at location 29 through bushings 73 and 74. A lock plate 77 is fixed to an inner side of arm member 70 and functions in cooperation with pin stop 55 to secure the frame in either a working position (as is shown) or in a storage position. The frame is moved from its working position (which may be either the transport mode as illustrated in FIG. 1 or the installation mode illustrated in FIG. 2) to its storage position (shown in FIG. 5) by disengaging pin stop 55 and rotating the upper segment relative to the lower segment about axle 72 until pin stop 55 aligns with plate hole 79. Insertion of pin stop 55 through hole 79 then secures the carriage in its storage position.

Figure 7:
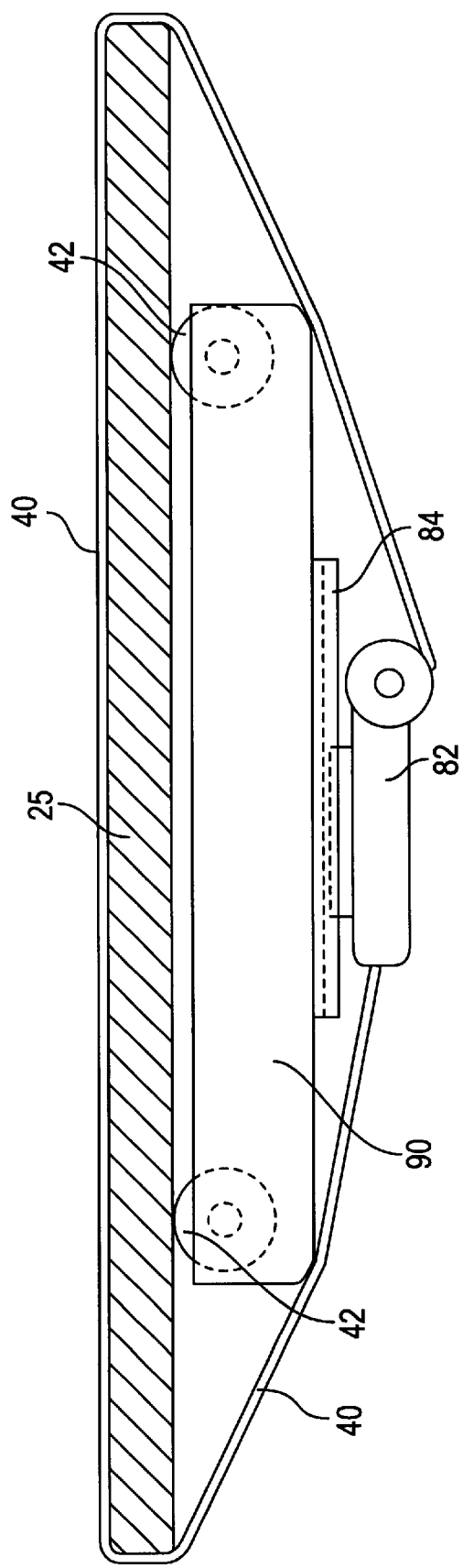
FIG. 7 is a top view of the means for securing a panel to the carriage frame, while allowing lateral movement of the panel relative to the frame.

Referring now to FIG. 7, there is shown a partially broken away top view of the mechanism for securing a door or other panel to the carriage frame. That mechanism allows free lateral movement of the door relative to the frame while at the same time preventing any lateral movement of strap 40 relative the panel or door 25. A channel member 80 is mounted at the top of frame arm members 18 (not shown in this view) and holds those arm members rigidly apart. A pair of door support rollers 42 are mounted one at either side of the channel member, and are arranged so that the door surface rests in contact with an edge of each roller. The door panel 25 is secured to the carriage frame against rollers 42 by strapping means 40 which circle the door and the frame. The two strap ends are held together and the strap is tensioned by means of strap clamp 82. Clamp 82 in turn is secured to channel 80 by means of a slide retainer 84. Retainer 84 is arranged to allow a restricted lateral movement of clamp 82 relative to channel 80. Rollers 42 allow door panel 25 to move laterally relative to frame member 80 while at the same time causing the strap 40 to remain stationary relative to the door panel.

Figure 8:
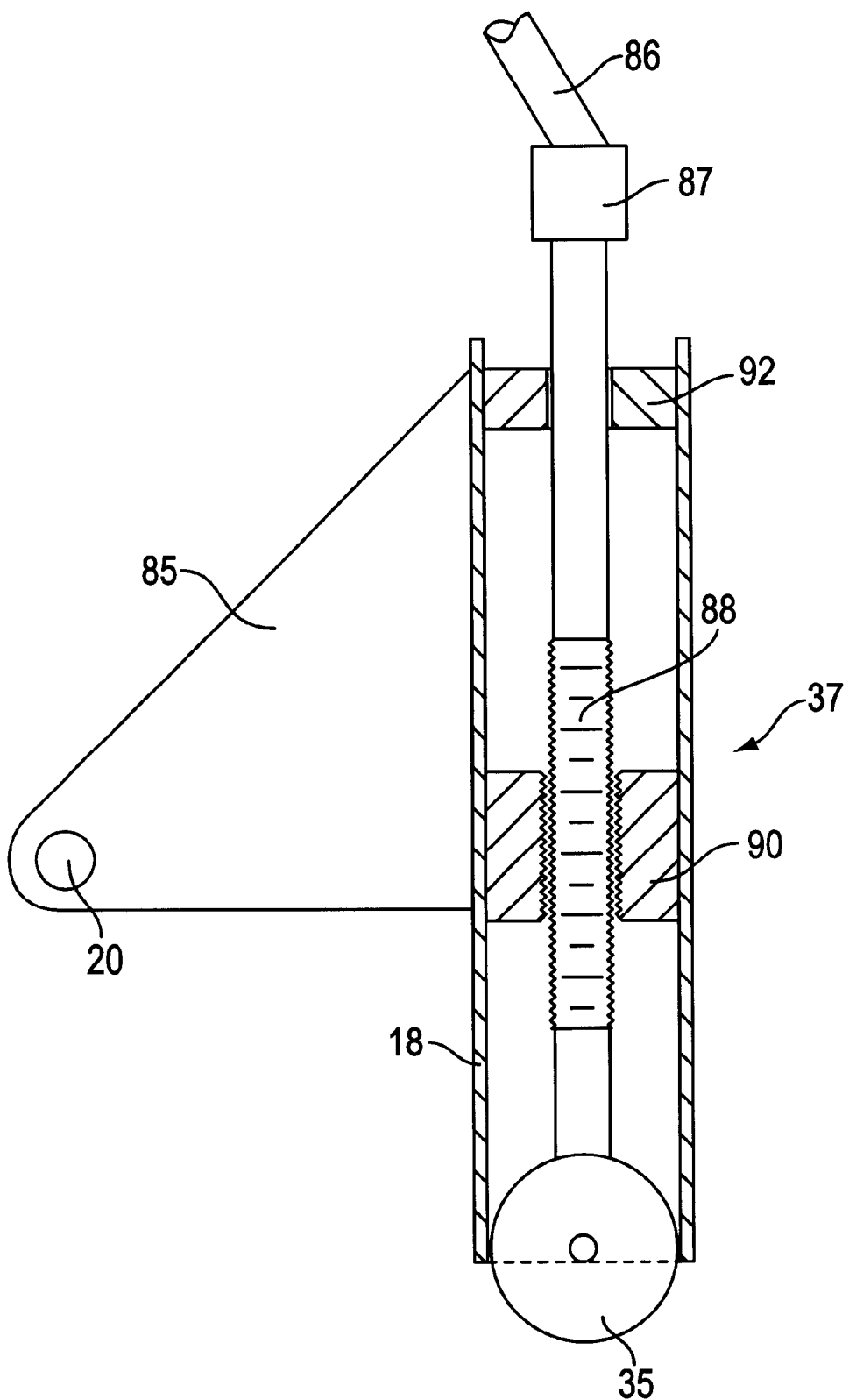
FIG. 8 is a partial sectional view of the side member vertical adjustment mechanism.

FIG. 8 is a partial sectional view of the lower end of side member 18 showing detail of the vertical adjustment mechanism 37 that serves to effectively lengthen or shorten member 18. As is better seen in FIGS. 1 and 2, side member 18 is mounted upon chassis 12 by means of a plate 85 that pivotally connects to the chassis at point 20. Extension 86 of hand crank 36 is fixed to the upper end of threaded elevator shaft 88 through flexible connector 87, while wheels or rollers 35 are rotatably connected to the lower end of that shaft. Rollers 35 are positioned such that they extend beyond the bottom of arm 18. Shaft 88 is coupled to arm 18 through threaded nut 90 and is centered within arm 18 by means of bushing 92. Turning hand crank 36 rotates shaft 88 causing the shaft and its attached rollers 35 to raise or lower, thus effectively lengthening or shortening arm 18.

As may be appreciated, the carriage of this invention provides precise and controlled positioning of a panel secured thereto relative to the carriage base. Independent drive mechanisms provide accurate control over the elevation, tilt and roll of a door panel held by the frame. Stability of the carriage during installation of a door or other panel is further enhanced through precisely controlled, lateral movement of the panel relative to the carriage frame.

The invention has been described in relation to preferred embodiments thereof that are illustrated in the various Figures. It must be understood that other variations of the invention will be apparent to those skilled in the art.

I claim:

1. A carriage for a construction panel comprising:
   a chassis having a front end and a rear end and having means for defining a multi-point rolling support;
   a planar frame pivotally connected to said chassis at the front end thereof, said frame including a pair of side members, an upper frame cross member, and a lower frame cross member and having a bottom sill member arranged to engage and support one edge of a construction panel;
   means for coupling the sill member to said lower frame cross member so that the sill member and the panel supported thereon are laterally movable relative to said frame side members in a direction parallel to the plane of the frame;
   and means for securing said panel to said frame at a location spaced apart from and above said sill member.

2. The carriage of claim 1 wherein the lower end of each said frame side member terminates in roller means, each said roller means adjustable along a longitudinal axis of said side member so as allow each side member to be lengthened or shortened independently of the other said side member.

3. The carriage of claim 2 including a plurality of additional roller means mounted on said frame adjacent said securing means, said additional roller means arranged to contact the side of a panel secured to said frame and to rotate when the sill member and panel are moved laterally relative to the frame.

4. The carriage of claim 3 wherein at least one said roller means is mounted in each frame side member.

5. The carriage of claim 1 wherein said means for securing the panel to the frame comprises strap means arranged to encircle said panel and clamping means to tighten said strap around the panel, said clamping means secured within a channel allowing limited lateral movement of said clamping means within the channel as the sill and panel are moved relative to the frame.

6. The carriage of claim 1 wherein the multi-point rolling support for said chassis comprises a plurality of casters.

7. The carriage of claim 6 wherein said chassis is generally rectangular in shape, and wherein a caster is mounted at each corner thereof.

8. The carriage of claim 6 wherein at least one said caster is equipped with a brake.

9. The carriage of claim 1 including a lever that is pivotally fixed at its lower end to said lower frame cross member and connected as well to said sill member so that movement of said lever causes lateral movement of said sill member in a direction parallel to the plane of said frame.

10. The carriage of claim 1 including a diagonal member extending from the rear of the chassis to a location on said frame that is intermediate the sill and the securing means; the length of said member being adjustable between at least three positions, one of said positions fixing the frame and a panel secured thereto in an essentially vertical installation attitude, a second of said positions fixing said frame and panel in a transport attitude wherein said frame and panel are tilted backwardly over the chassis to allow passage of the carriage and panel through an opening, and a third of said positions positioning said frame in a reclining attitude above and generally parallel to said chassis.

11. The carriage of claim 10 wherein the frame and panel are tilted at about a 75° angle to the horizontal when in said second transport attitude.

12. The carriage of claim 10 wherein said diagonal member includes a secondary length adjusting mechanism that is arranged to incrementally lengthen or shorten said member when said frame is fixed in said first vertical installation position to thereby adjustably tilt said panel back and forth about that installation position.

13. The carriage of claim 10 wherein said diagonal member includes two articulated segments that are arranged to fold and, when folded, fixes said frame in said third position.

* * * * *